US006531231B1

(12) United States Patent
Ito et al.

(10) Patent No.: US 6,531,231 B1

(45) Date of Patent: Mar. 11, 2003

(54) RECORDING MATERIAL AND PRODUCTION METHOD THEREOF

(75) Inventors: Katsuya Ito; Toru Kotani; Toshitake Suzuki, all of Ohtsu (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 09/307,455

(22) Filed: May 7, 1999

Related U.S. Application Data

(63) Continuation of application No. 08/660,312, filed on Jun. 7, 1996, now Pat. No. 5,912,085.

(30) Foreign Application Priority Data

Jun. 7, 1995 (JP) ............................................ 7-140793
Jun. 7, 1995 (JP) ............................................ 7-166892
Jun. 21, 1995 (JP) ............................................ 7-179453

(51) Int. Cl.[7] ................................................ B32B 27/00

(52) U.S. Cl. ................. 428/500; 428/423.1; 428/423.7; 428/480; 427/379; 427/393.5; 427/385.5; 346/135.1

(58) Field of Search ................................ 428/500, 480, 428/423.1, 423.7; 346/135.1; 427/373, 379, 393.5, 385.5

(56) References Cited

U.S. PATENT DOCUMENTS 4,701,837 A 10/1987 Sakaki et al.
5,569,529 A * 10/1996 Becker et al. .............. 428/331
5,607,809 A * 3/1997 Nakamura et al. .......... 430/201
5,750,200 A * 5/1998 Ogawa et al. .............. 427/361

FOREIGN PATENT DOCUMENTS

| | | |
|---|---|---|
| EP | 0 428 144 | 5/1991 |
| EP | 0 594 896 | 5/1994 |
| EP | 0 650 850 | 5/1995 |
| JP | 63-315283 | 12/1988 |
| JP | 4-285650 | 10/1992 |
| JP | 6-72017 | 10/1993 |
| JP | 5-278322 | 10/1993 |
| JP | 6-79967 | 3/1994 |
| JP | 6-183131 | 5/1994 |
| JP | 7-117335 | 5/1995 |

OTHER PUBLICATIONS

Japanese Patent Office Official Action for JP Application No. 140403/1996 dated Jun. 16, 2000 with translation.

* cited by examiner

*Primary Examiner*—Christopher Raimund

(57) ABSTRACT

A recording material comprising a substrate layer and an ink receiving layer formed on said substrate layer, wherein the ink receiving layer has a retention of ink concentration after water immersion of not less than 30% and a surface gloss of not less than 55%. The recording material of the present invention is capable of absorbing ink quickly, which ink being hard to be removed even after pouring water thereon, and of color ink jet printing with high surface gloss. The recording material of the present invention permits provision of printed matters having high gloss, high quality and high grade, like silver salt photographs.

17 Claims, No Drawings

RECORDING MATERIAL AND PRODUCTION METHOD THEREOF

This application is a continuation of Ser. No. 08/660,312, filed Jun. 7, 1996, now U.S. Pat. No. 5,912,085.

Priority of Ser. Nos. 7-140793; 7-166892 and 7-179453, filed on Jun. 7, 1995 and Jun. 21, 1995, respectively in Japan are hereby claimed under 35 USC 119. The priority applications were filed in U.S. Ser. No. 08/660,312 on Jul. 17, 1996.

FIELD OF THE INVENTION

The present invention relates to a recording material and a method for production thereof. More particularly, the present invention relates to a recording material for ink jet printing and a method for production thereof.

BACKGROUND OF THE INVENTION

Along with the recently prevailing electronic still cameras and computers, a hard copy technique has ben rapidly developed for recording the images thereof on paper, etc. The ultimate goal of the hard copy is the provision of recorded materials having high quality like silver salt photographs. In particular, how close the color reproduction, image density, gloss weatherability and the like can be brought to those of silver salt photographs is the problem posed during such development. The method for hard copy includes various methods such as a method comprising direct photographing of a display presenting images into silver salt photographs, sublimation heat transfer, ink jet method and electrostatic image transfer.

An ink jet printer has recently become very popular since it permits full color printing with ease and produces low printing noises. The ink jet printing is based on a high speed injection of ink drops from a nozzle toward recording materials, and the ink contains large amounts of solvents. For this reason, ink jet recording material is required to quickly absorb the ink and exhibit superior color developing performance.

However, conventional recording materials for ink jet printing have poor water resistance, so that when water adheres to the printed matter after absorption of the ink by an ink receiving layer, the ink tends to release from the material. In addition, slow absorption of the ink causes set-off during consecutive printing, and the gloss of the surface becomes poorer than in solver salt photographs, thus failing to provide high quality and high grade recording, such as silver salt photographs.

The present invention aims at solving such problems, and its object is to provide a recording material superior in water resistance, which has high gloss on the surface, permits recording by a color printer, and is capable of high quality and high grade recording like silver salt photographs, as well as methods for production thereof.

SUMMARY OF THE INVENTION

According to the present invention, there is now provided (1) a recording material comprising a substrate layer and an ink receiving layer formed on this substrate layer, wherein the ink receiving layer has a retention of ink concentration after water immersion of not less than 30% and a surface gloss of not less than 55%.

Other preferable embodiments are as follows.

(2) The recording material of (1), having a light permeability exceeding 60%.

(3) The recording material of (1), having a light permeability of not more than 60%.

(4) The recording material of (1), wherein the time necessary for the ink receiving layer to absorb 0.1–1.0 $\mu l/cm^2$ of an ink is not longer than 50 seconds.

(5) The recording material of (1), wherein the ink receiving layer comprises an ink absorptive resin, a curing agent and a surfactant.

(6) The recording material of (5), wherein the ink receiving layer further comprises a compound having a cation group.

(7) The recording material of (5), wherein the ink absorptive resin is polyvinyl alcohol.

(8) The recording material of (5), wherein the curing agent is a water soluble melamine resin.

(9) The recording material of (5), wherein the ink absorptive resin content of the ink receiving layer is 10–99% by weight.

(10) The recording material of (5), wherein the content of the curing agent is 0.1–20% by weight relative to the amount of the ink absorptive resin.

(11) The recording material of (5), wherein the surfactant content of the ink receiving layer is 0.5–20% by weight.

(12) The recording material of (1), wherein the substrate layer is a polyester film.

(13) The recording material of (3), wherein the substrate layer is a film having a number of fine voids and an apparent specific gravity of not less than 0.7 and less than 1.32.

(14) The recording material of (3), wherein the substrate layer has an inplane birefringence of from −0.02 to +0.04.

(15) The recording material of (1), further comprising an intermediate layer between the substrate layer and the ink receiving layer.

(16) The recording material of (15), wherein the intermediate layer comprises at least one member selected from the group consisting of polyester resin, polyurethane resin and polyacrylic resin.

(17) The recording material of (1), further comprising an easy slip layer formed on the substrate layer on the opposite surface from the ink receiving layer.

(18) The recording material of (17), wherein the easy slip layer comprises at least one member selected from the group consisting of polyester resin, polyurethane resin and polyacrylic resin, inorganic particles and/or organic particles, and an antistatic agent.

The present invention also relates to a method for producing a recording material, which comprises applying a composition comprising an ink absorptive resin, a curing agent, a surfactant and a solvent onto a substrate layer, heating the coating layer to a temperature not less than the boiling point of the solvent and not more than the boiling point plus 30° C., and further heating the layer at a temperature higher than said temperature to form an ink receiving layer.

Preferably the method comprises applying a composition comprising an ink absorptive resin, a curing agent, a surfactant and water onto a substrate layer, heating the coating layer to 100–130° C., and further heating the layer at 130–180° C. to form an ink receiving layer.

DETAILED DESCRIPTION OF THE INVENTION

The recording material of the present invention comprises a substrate layer and an ink receiving layer formed on said substrate.

The substrate is subject to no particular limitation, and may be, for example, natural paper, synthetic paper, cloth, nonwoven fabric, wood, metal, plastic film, glass, artificial leather, natural leather, or an adhesion laminate of optional two or more members therefrom. The substrate layer may be a single layer or a composite having two or more layers.

When the substrate layer is a plastic film the material thereof is not particularly limited, and may be, for example, polyester resin, polyolefin resin, polyamide resin, polyacrylic resin, polyurethane resin, polyvinyl resin, polyether resin or polystyrene resin, with particular preference given to the following polyester resin.

That is, a polyester produced by condensation polymerization of an aromatic dicarboxylic acid such as terephthalic acid, isophthalic acid and naphthalene dicarboxylic acid, or an ester thereof, and a glycol such as ethylene glycol, diethylene glycol, 1,4-butanediol and neopentyl glycol. Such polyester can be also produced by, besides the direct reaction of aromatic dicarboxylic acid and glycol, ester exchange reaction between alkyl ester of aromatic dicarboxylic acid and glycol, followed by condensation polymerization, condensation polymerization of diglycol ester of aromatic dicarboxylic acid and the like. Typical examples of the polyester are polyethylene terephthalate, polybutylene terephthalate and polyethylene-2,6-naphthalate. These polyesters may be a homopolymer of a copolymerized product of two or more kinds of acid component and/or glycol component. According to the present invention, ethylene terephthalate unit, butylene terephthalate unit or ethylene-2,6-naphthalate unit is contained in a proportion of not less than 70% by mole, preferably not less than 80% by mole, and more preferably not less than 90% by mole of polyester.

The substrate film may contain inorganic or organic particles as necessary. The particles which may be added include silica, kaolinite, talc, calcium carbonate, zeolite, alumina, barium sulfate, carbon black, zinc oxide, titanium oxide, crosslinked acrylic particles and crosslinked polystyrene particles, which may be selected without limitation. The addition of such particles results in better slip characteristics of the obtained recording material and better handling property, which in turn brings about improved travel property in a printer.

It is also possible to form, for better handing property, an extremely thin layer on at least one surface of the substrate film without particles.

Such substrate film is transparent, and a recording material using such substrate film can be suitably used for the materials to be seen through, such as those for OHP and back print film advertisements.

When the recording material of the present invention is required to be opaque, a substrate film having a number of fine voids is preferably used. The method of forming fine voids is not particularly limited, but the method is preferable which comprises adding a thermoplastic resin incompatible with polyester and/or particles to polyester and orienting same in at least monoaxially. Such opaque recording material is free of being seen through to the back of the film, thus making the appearance of the printed matter fine.

The thermoplastic resin incompatible with polyester to be used in the present invention is not particularly limited as long as it is incompatible with polyester. Examples thereof include polystyrene resin, polyolefin resin, polyacrylic resin, polycarbonate resin, polysulfone resin, cellulose resin and polyamide resin, with particular preference given to polystyrene resin and polyolefin resin such as polymethylpentene, polypropylene, cyclic olefin. The amount of the incompatible resin to be mixed with the polyester varies depending on the desired amount of voids. It is preferably 3% by weight-39% by weight, particularly 5% by weight-15% by weight of the substrate film When it is less than 3% by weight, the formation of voids is subject to limitation, thus failing to achieve the desired flexibility, light weightedness and image drawability. When it exceeds 39% by weight, the drawability of the film becomes drastically impaired and heat resistance, strength and nerve become poor. These thermoplastic resins may be used in combination.

The particles to be used include the above-mentioned inorganic and organic particles. The particle content of the substrate film is preferably from 0.1% by weight to 20% by weight, more preferably from 0.5% by weight to 10% by weight, for the same reasons with the cases of incompatible resins, and the average particle size of the particles is preferably 0.1–10 ||m.

The substrate film preferably has an apparent specific gravity of not less than 0.7 and less than 1.32, more preferably not less than 1.0 and less than 1.25, and most preferably not less than 1.05 and less than 1.25. When the apparent specific gravity is less than 0.7, the void content becomes too great to cause marked impairment of the strength of the film, which in turn results in easy occurrence of cracks and wrinkles on the surface of the film, irrespective of the longitudinal and transverse balances. When the apparent specific gravity is not less than 1.32, the void content becomes too small to degrade cushioning property, which in turn results in inferior image drawability on the recording material when written with a pencil.

Such substrate film preferably has an inplane birefringence of from −0.02 to +0.04, more preferably from 0 to +0.03. An inplane birefringence of not less than −0.02, more preferably not less than 0, leads to a substrate film substantially having an isotropy. An inplane birefringence of plus (+) or minus (−) means that the hysteresis of lengthwise drawing remains to a greater or less degree than that of the crosswise drawing, and it may accompany a slight inclination of the principal axis, which is caused by a so-called bowing phenomenon upon crosswise drawing. The substrate film preferably has an inplane birefringence of not less than −0.02, more preferably not less than 0, whereby the film becomes hard to tear in the transverse direction of the film. When the inplane birefringence exceeds +0.04, the film easily tears in the lengthwise direction of the film, which results in breakage upon slitting of the film and lengthwise tearing of the film upon cutting the film into sheets. When the inplane birefringence is less than −0.02 or above +0.04, the recording material tends to have wrinkles and curling upon printing by a printer.

The method for producing such substrate film is not particularly limited. In the most preferably production, an undrawn film is drawn 3.0 times or more in the lengthwise direction of the film by one step or multiple steps, relaxed in the lengthwise direction of the film by not less than 3%, then crosswisely drawn at a draw ratio not less than the lengthwise draw ratio after the relaxation treatment, and heat treated.

In the first lengthwise drawing, the film is drawn in between two or more rolls having difference rolling speeds. The heating in this step may be performed by, for example, using heated rolls or heating without direct contact with the rolls, which methods may be used in combination. It is preferable to set the lengthwise drawing temperature to not less than (Tg+10)° C. and not more than (Tg+50)° C. wherein Tg is the glass transition temperature of polyester, and the draw ratio to not less than 3.0, preferably 3.2–5.0, so that a number of fine voids can be formed in the interface between the incompatible resin and polyester. When the lengthwise draw ratio is less than 3.0, fine voids cannot be formed sufficiently in the film, and therefore it may be difficult to make the apparent specific gravity of the substrate film less than 1.32. When the lengthwise draw ratio exceeds 5.0, the subsequent relaxation tends to be insufficient, which in turn makes it substantially difficult to adjust the inplane birefringence of the substrate film to not more than +0.04.

Then, a relaxation treatment by 3% or more, preferably 5% or more, in the lengthwise direction follows. The more preferable relaxation ratio varies depending on the draw ratio of the lengthwise drawing preceding the relaxation. The relaxation ratio is preferably set such that the lengthwise draw ratio after the relaxation becomes 2.8–3.5. When the relaxation ratio is set to not less than 3%, an industrially stable production of the substrate film having an inplane birefringence of −0.02–+0.04 becomes realizable. In contrast, a relaxation ratio of less than 3% may noticeably degrade the crosswise drawing performance in the next step, making preparation of the film having an inplane birefringence of −0.02–+0.04 difficult. A film having an apparent specific gravity of not less than 1.32 (a film having less fine voids) is capable of achieving an isotropy without such relaxation treatment. However, a substrate film having a preferably specific gravity cannot be obtained.

A preferable lengthwise draw ratio after the lengthwise relaxation is from 2.8 to 3.5. When the lengthwise draw ratio after relaxation is less than 2.8, the relaxation tends to become nonuniform, thus providing a nonuniform substrate film, and the inplane birefringence of the film after biaxial drawing tends to be less than −0.02. In contrast, when the lengthwise draw ratio after the relaxation exceeds 3.5, the drawability during crosswise drawing tends to be defective and the inplane birefringence of the film after biaxial drawing tends to easily exceed +0.04.

The relaxation is done by, for example, a method comprising once cooling the film and re-heating same to about 80–150° C. in an oven, a method comprising relaxation treatment of the film between rolls without cooling immediately after the lengthwise drawing, a method comprising relaxation treatment between a group of driven rolls or free rolls heated to about 60–100° C., and a method combining these methods as appropriate. Of these relaxation treatment methods, the most preferred is the method comprising a relaxation treatment without cooling immediately after the lengthwise drawing, and this method enables uniform and efficient relaxation treatment.

After the above-mentioned relaxation treatment, the film is led to a tenter and subjected to crosswise drawing at a ratio not less than the lengthwise draw ratio after the relaxation treatment, which is followed by heating. The preferably crosswise drawing temperature is not less than the highest temperature during the lengthwise drawing and relaxation treatment and not more than (Tm−10)° C. Wherein Tm is a melting point of the polyester. When the crosswise draw ratio is smaller than the lengthwise draw ratio after the relaxation treatment, the inplane birefringence of the obtained film may not be easily adjusted to not more than +0.04.

While the upper limit of the crosswise draw ratio is not particularly set, it is preferably not more than (lengthwise draw ratio after relaxation treatment+1.0), whereby the inplane birefringence of the ultimately obtained film can be certainly made not less than −0.02.

The biaxially stretched film thus obtained is subjected to a heat treatment on demand. The heat treatment is preferably applied in a tenter at a temperature of (Tm−50)–Tm° C. A crosswise re-drawing and crosswise relaxation may be applied in parallel with this heat treatment.

The ink receiving layer preferably contains an ink absorptive resin, a curing agent and a surfactant. The ink absorptive resin may be a known resin as long as it has an ink absorbing performance, and includes, for example, polyvinyl alcohol, acrylic resin, styrene-acryl copolymer, ethylene-vinyl acetate copolymer, starch, polyvinyl butyral, gelatin, casein, ionomer (e.g., ionomers of polyester and polyolefin), gum arabic, carboxymethylcellulose, polyvinyl pyrrolidone, polyacrylamide, polyester and styrene-butadiene rubber, from which one or more kinds may be used. Among others, polyvinyl alcohol is mot preferable which has a polymerization degree of 1400–2500 and a saponification value of 85–90. The ink absorptive resin content of the ink receiving layer is preferably 10–99 wt %, more preferably 50–99 wt %. When the content is less than 10 wt %, the ink absorbing time may exceed 50 seconds at the ink amount of 0.1–1.0 $\mu l/cm^2$ on the ink receiving layer, which undesirably results in slow absorption of the ink and set-off of consecutive printed matters. When the content is greater than 99 wt %, the curing agent content of the ink receiving layer may decrease to cause poor retention of the ink concentration after water immersion, such as less than 30%, thus undesirably leading to insufficient water resistance.

The curing agent has a crosslinking functional group and is capable of crosslinking the above-mentioned ink absorptive resins, such as melamine resins, epoxy resins, polyurethane resins, polyether resins, isocyanate compounds and anhydrous maleate-isobutylene copolymers, with preference given to water soluble melamine resins. The addition of such curing agent increases the hardness of the ink receiving layer and contributes to better water resistance. The curing agent is contained in a proportion of from 0.1 wt % to 20 wt %, preferably from 0.5 wt % to 10 wt %, relative to the amount of the ink absorptive resin. When it is contained in a proportion of less than 0.1 wt %, the retention of ink concentration after water immersion may become less than 30%, thus undesirably leading to insufficient water resistance. In this case, water poured after absorption of ink by the ink receiving layer undesirably causes release of the ink. On the other hand, when it exceeds 20 wt %, the ink absorptive resin content of the ink receiving layer may decrease to make the ink absorbing time exceed 50 seconds at the ink amount of 0.1–1.0 $\mu l/cm^2$ on the ink receiving layer, which also results in undesirable poor absorption of the ink. Where necessary, a catalyst may be added for promoting reactions.

The surfactant may be cationic, anionic or nonionic. Preferred are silicon and fluorine surfactants. Examples of the silicon surfactants include dimethylsilicon, aminosilane, acrylsilane, vinylbenzylsilane, vinylbenzylaminosilane, glycidesilane, mercaptosilane, dimethylsilane, polydimethylsiloxane, polyalkoxysiloxane, hydrodiene-modified siloxane, vinyl-modified siloxane, hydroxy-modified siloxand, amino-modified siloxane, carboxyl-modified siloxane, halogen-modified siloxane, epoxy-modified siloxane, methacryloxy-modified siloxane, mercapto-modified siloxane, fluorine-modified siloxane, alkyl-modified siloxane, pheny-modified siloxane and alkylen oxide-modified siloxane. Examples of the fluorine surfactant include ethylene tetrafluoride, perfluoroalkylammonium salt, perfluoroalkylsulfonamide, sodium perfluoroalkylsulfonate, perfluoroalkyl potassium salt, perfluoroalkylcarboxylate, perfluoroalkylsulfonate, perfluoroalkylethylene oxide adduct, perfluoroalkyltrimethyl ammonium salt, perfluoroalkylaminosulfonate, perfluoroalkylphosphoric ester, perfluoroalkylalkyl compounds, perfluoroalkylalkyl betaine and perfluoroalkylhalogenides. The surfactant content of the ink receiving layer is preferably 0.5–20 wt %, more preferably 1–10 wt %. When the content exceeds 20 wt % or is less than 0.5 wt %, the ink receiving layer undesirably cannot show superior ink absorption and superior water resistance at the same time.

The addition of the above-mentioned amounts of surfactant can increase the surface gloss while retaining the superior ink absorption and fine water resistance of the ink receiving layer.

The ink receiving layer preferably further contains a compound having a cation group, more preferably contains polyvinyl alcohol having a cation group and a dye having a cation group, by which ink absorption can be enhanced. Alternatively, the aforementioned ink absorptive resin which underwent cation denaturation may be used instead of such compound having a cation group, and polyvinyl alcohol having a cation group and the following compound can be preferably used for this end.

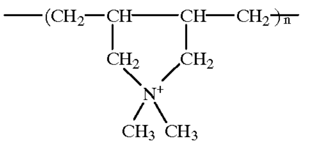

When the above-mentioned ink absorptive resin is concurrently used, the compound content of the ink receiving layer is preferably 0.1–30 wt %, more preferably 1–20 wt %.

Where necessary, particles such as silica, kaolinite, talc, calcium carbonate, zeolite, alumina, barium sulfate, carbon black, zinc oxide, titanium oxide, organic white pigment, benzoguanamine particles, crosslinked polystyrene particles, crosslinked acrylic particles and aluminum hydroxide, may be added to the ink receiving layer to the extend that the surface gloss is not impaired. When the recording material of the present invention is required to have transparency or opacity, the content of the particles is appropriately adjusted. The average particle size of the particles is preferably not less than 0.1 μm, more preferably not less than 0.3 μm. The addition of such particles contributes to better slip characteristics of the recording material to facilitate travel thereof in a printer, as well as better writability with pencils.

The ink receiving layer may comprise a single layer or two or more layers.

The ink receiving layer can be prepared, for example, in the following manner. A coating solution for the ink receiving layer containing an ink absorptive resin, a curing agent, a surfactant and a solvent is prepared. Examples of the solvent include water and polar solvents miscible with water, such as alcohol, glycol and acetone. The coating solution is applied onto a substrate layer. The application method is not particularly limited and may be a method generally used for this end, such as gravure coating method, kiss coating method, dipping method, spray coating method, curtain coating method, air knife coating method, blade coating method, reverse roll coating method and bar coating method. The solution is preferably applied in such an amount that makes the thickness after drying 8–50 $g/m^2$. When the amount coated is less than 8 $g/m^2$, the ink receiving layer becomes too thin to completely absorb the ink, and when it exceeds 50 $g/m^2$, the ink is absorbed deeply to decrease printing concentration, which are both disadvantageous.

Then, the coating layer is heated to dry and cure. In this heating step, sufficient curing leads to defective ink absorption of the ink receiving layer, and termination of curing such that the ink absorption of the ink receiving layer becomes sufficient leads to poor water resistance of the ink receiving layer. It follows that heating conditions improving ink absorption and water resistance of the ink receiving layer need to be employed.

According to the present invention, the heating step preferably comprises two steps of heating at temperatures not less than the boiling point of the solvent, which temperatures are elevated successively. In the first step immediately after initiation of drying, the layer is heated at a temperature from the boiling point of the solvent to that plus 30° C. to mainly remove the solvent. The drying time is preferably from one minute to 10 minutes. In the second step, heating is done at a temperature higher than the temperature in the first step to completely remove the solvent, to heat-cure the ink receiving layer to a desired degree, and to allow surfactant to move to the surface for localization. The drying time is preferably from 0.5 minute to 10 minutes. Such heating method is particularly effective for the production of recording materials containing a water soluble resin as a curing agent. Such heating conditions are conducive to superior ink absorption, water resistance and surface gloss of an ink receiving layer.

The adhesion between the substrate layer and the ink receiving layer can be improved by forming an intermediate layer between them. The compound to constitute the intermediate layer may be those disclosed to increase the adhesion of polyester films, such as polyester resins, polyurethane resins, polyacrylic resins and polyester urethane resins, with preference given to polyester resins. These resins can be used solely or in combination.

The polyester resin to be the intermediate layer can be obtained by the reaction between dibasic acid and glycol, and is particularly a water soluble, emulsifiable or dispersible polyester resin. For example, the polyester resin is obtained by reacting dicarboxylic acid components and glycol component, wherein the dicarboxylic acid component is a dibasic acid comprising dicarboxylic acid having a metal sulfonate group (e.g., $—SO_3Na$) in a proportion of 50–0.5% by mole of the entire dicarboxylic acid. Examples of the dicarboxylic acid having a metal sulfonate group include metal salt of sulfoterephthalic acid, 5-sulfoisophthalic acid, 4-sulfophthalic acid, 4-sulfonaphthalene-2,7-dicarboxylic acid, 5-[4-sulfophenoxy]isophthalic acid and the like, with particular preference given to sodium 5-sulfoisophthalate and sodium sulfoterephthalate. These dicarboxylic acid having a metal sulfonate group are contained in a proportion of 50–0.5% by mole, preferably 20–1% by mole, relative to the entire dicarboxylic acid. When it exceeds 50% by mole, dispersibility in water may be improved, but water resistance of the copolymer decreases. The dispersibility in water of the polyester copolymer varies depending on the composition of copolymer, and the kind and amount of the water soluble organic compound. The content thereof is preferably smaller as long as it does not lose dispersibility in water.

Examples of dicarboxylic acid without a metal sulfonate group include aromatic, aliphatic and alicyclic dicarboxylic acids. Examples of the aromatic dicarboxylic acid include terephthalic acid, isophthalic acid, orthophthalic acid and 2,6-naphthalene dicarboxylic acid. These aromatic dicarboxylic acids are preferably contained in a proportion of not less than 40% by mole of the entire dicarboxylic acid component. When it is less than 40% by mole, the mechanical strength and water resistance of polyester copolymer decrease. Examples of the aliphatic and alicyclic dicarboxylic acids include succinic acid, adipic acid, sebacic acid, 1,3-cyclopentanedicarboxylic acid, 1,2-cyclohexanedicarboxylic acid, 1,3-cyclohexanedicarboxylic acid and 1,4-cyclohexanedicarboxylic acid. The addition of these aliphatic or alicyclic dicarboxylic acid component may increase adhesion, but generally detrimental to the mechanical strength and water resistance of the polyester copolymer.

The glycol component to be reacted with the above-mentioned dicarboxylic acid mixture is, for example, aliphatic glycol having 2 to 8 carbon atoms, alicyclic glycol having 6 to 12 carbon atoms or a mixture of these two, such as ethylene glycol, 1,2-propylene glycol, 1,3-propanediol, 1,4-butanediol, neopentyl glycol, 1,6-hexanediol. 1,2-cyclohexanedimethanol, 1,4-cyclohexanedimethanol and p-xylene glycol. Examples of the aliphatic diol having 4 or more carbon atoms include diethylene glycol and triethylene glycol, and examples of polyether include polyethylene glycol, polypropylene glycol and polytetramethylene glycol.

The above-mentioned polyester copolymer can be obtained by conventional melt condensation polymerization. Examples thereof include direct esterification method comprising direct reaction of the above-mentioned dicarboxylic acid component and glycol component, evaporation of water for esterification and condensation polymerization, and ester exchange method comprising reaction of dimethyl ester of dicarboxylic acid component and glycol component, evaporation of methyl alcohol for ester exchange and condensation polymerization. Alternatively, solution condensation polymerization and interface condensation polymerization provide such polymer. Note that the present invention is not limited to the above-mentioned production methods. In melt condensation polymerization, antioxidant, slip agent, inorganic fine particles and antistatic agent may be added as necessary. The aforementioned polyethers such as polyethylene glycol can be added during melt condensation polymerization or after condensation polymerization upon melt blending.

The polyurethane resin to be the intermediate layer may be obtained by reacting (1) a compound having two ore more active hydrogen atoms in a molecule and (2) an organic polyisocyanate having two or more isocyanate groups in a molecule, and where necessary, (3) a chain extender having at least two active hydrogen atoms in a molecule, and has an isocyanate group end.

Examples of the compounds known as the above-mentions (1) include those having two or more hydroxyl groups, carboxyl groups, amino groups or mercapto groups at an end or in a molecule, with particular preference given to polyether polyol, polyester polyol and polyether ester polyol. The polyether polyol may be, for example, a compound obtained by polymerization of alkylene oxides such as ethylene oxide and propylene oxide, styrene oxide or epichlorohydrine; random copolymerization compound thereof; block copolymerization compound thereof; or compound obtained by addition polymerization with polyhydric alcohol. Examples of the polyester polyol and polyether ester polyol include linear or branched compounds which can be obtained by condensation of poly-saturated or unsaturated carboxylic acid or anhydrides thereof, such as succinic acid, adipic acid, phthalic acid and maleic anhydride, and poly-saturated or unsaturated alcohols such as ethylene glycol, diethylene glycol, 1,4-butanediol, neopentyl glycol, 1,6-hexanediol and trimethylolpropane; polyalkylene ether glycols having relatively smaller molecular weight, such as polyethylene glycol and polypropylene glycol; or a mixture of these alcohols. Examples of polyester polyol include polyesters obtained from lactone and hydroxy acid, and examples of polyether ester polyol include polyether esters obtained by adding ethylene oxide or propylene oxide to polyesters previously prepared.

The organic polyisocyanate of the aforementioned (2)is exemplified by isomers of toluylene diisocyanate, aromatic diisocyanates such as 4,4'-diphenylmethane diisocyanate, aromatic aliphatic diisocyanates such as xylilene diisocyanate, aliphatic diisocyanates such as isophorone diisocyanate and 4,4'-dicyclohexylmethane diisocyanate, and polyisocyanates obtained by adding these compounds singly or in combination to trimethylol propane and the like.

Examples of the above-mentioned chain extender having at least two active hydrogen atoms of (3) include glycols such as ethylene glycol, diethylene glycol, 1,4-butanediol and 1,6-hexanediol; polyhydric alcohols such as glycerine, trimethylolpropane and pentaerythrithol; diamines such as ethylene diamine, hexamethylene diamine and piperazine; amino alcohols such as monoethanolamine and diethanolamine; thioglycols such as thiodiethylene glycol; and water.

The polyacrylic resin of the intermediate layer can be obtained by polymerization of acrylic acid or derivative thereof, and, where necessary, a monomer having a vinyl group besides acrylic acid (derivative). The monomer to be used is exemplified by acrylic acid, methacrylic acid [hereinafter acrylic acid and/or methacrylic acid are/is to be referred to as (meth)acrylic acid], lower alkyl ester (e.g., methyl, ethyl, propyl, butyl, amyl, hexyl, heptyl, octyl and 2-ethylhexyl ester) or (meth)acrylic acid, methyl methacrylate, hydroxymethyl acrylate, styrene, glycidyl methacrylate, methyl acrylate and ethyl acrylate.

Where necessary, the intermediate layer may contain particles having an average particle size of not less than 0.1 $\mu$m, preferably not less than 0.3 $\mu$m. Examples thereof include, but not limited to, silica, kaolinite, talc, calcium carbonate, zeolite, alumina, barium sulfate, carbon black, zinc oxide, titanium oxide, and organic white pigment (e.g., crosslinked acrylic particles and crosslinked stylene particles). When the average particle size is less than 0.1 $\mu$m, image drawability with pencils is insufficient.

The method for forming an intermediate layer include methods generally used for this end, such as gravure coating method, kiss coating method, dipping method, spray coating method, curtain coating method, air knife coating method, blade coating method and reverse roll coating method. Such intermediate layer may be formed before drawing the film after lengthwise drawing, or after orientation of the film.

According to the present invention, an easy slip layer may be formed on the opposite surface from the ink receiving layer on the substrate layer. This layer can be formed by the same technique as used for forming the intermediate layer. Such easy slip layer may contain antistatic agent, fluorescent whitening agent and ultraviolet absorber, which are generally used in the art. In this case, the center line second dimensional surface roughness of the easy slip layer is preferably greater than that of the ink receiving layer. To achieve this, the above-mentioned particles are preferably contained. When the roughness is small, the slippage between the ink receiving layer and the easy slip layer becomes poor to prevent smooth travel of the paper through the printer.

The recording material thus obtained quickly absorbs ink, which ink being hard to be removed even after pouring water thereon, and is capable of color ink jet printing to provide printed matters having high gloss, high quality and high grade, like silver salt photographs.

The retention of ink concentration after water immersion of the ink receiving layer if the recording material of the present invention is not less than 30%, preferably not less than 40%, and more preferably not less than 50%. When the retention is less than 30%, the ink receiving layer has poor water resistance, which is evidenced by blurring of the ink when water is poured thereon, or peeling of the ink receiving layer from the substrate. The method for making the retention fall within the above-mentioned range is not particularly limited, and is exemplified by a method comprising addition of a certain amount of a curing agent to the ink receiving layer and a method utilizing specific heating conditions when forming the ink receiving layer. As used herein, the retention of ink concentration after water immersion is determined from the difference in the concentration of the ink before and after immersing the printed matter in water.

The surface gloss of the ink receiving layer of the recording material of the present invention is not less than 55%, preferably not less than 70%, more preferably not less than 80%, and most preferably not less than 90%. When the surface gloss is less than 55%, the printed matter fails to have high gloss, high quality or high grade similar to those of the silver salt photographs. The method for making the surface gloss fall within the above-mentioned range is not particularly limited, and is exemplified by a method comprising addition of a certain amount of a surfactant to the ink receiving layer and a method utilizing specific heating conditions when forming the ink receiving layer.

The ink absorption of the ink receiving layer of the recording material of the present invention is expressed by the time necessary to dry the matter sprinted by ink jet printing on a recording material, which is not longer than 50 seconds, preferably not longer than 30 seconds, more preferably not longer than 15 seconds, and most preferably not longer than 5 seconds, at the ink amount of 0.1–10 $\mu l/cm^2$. When the ink absorption time exceeds 50 seconds, thereby-caused poor ink absorption may result in set-off when a plurality of sheets are printed. The method for making the ink absorption time fall within the above-mentioned range is not particularly limited, and is exemplified by a method comprising addition of a certain amount of an ink absorptive resin to the ink receiving layer and a method utilizing specific heating conditions when forming the ink receiving layer.

When the recording material of the present invention is used for materials requesting transparency such as for OHP, the light permeability thereof is preferably not less than 60%, more preferably not less than 80%. When light permeability is less than 60%, the printed matters are difficult to se through clearly and the material is not suitable for such use as OHP. The method for making the light permeability fall within the above-mentioned range is exemplified by a method comprising decreasing the amount of the particles to be added to the substrate film for better handling of the recording material.

When the recording material of the present invention is requested to be opaque, the light permeability thereof is preferably not more than 60%, more preferably not more than 20%, and most preferably not more than 15%. When light permeability is more than 60%, the back of the printed matters can be seen through, thus making the appearance of the printed matters undesirably poor. The method for making the light permeability fall within the above-mentioned range is exemplified by a method comprising forming fine voids in the substrate layer. In so doing, the amount of the incompatible resin and particles is appropriately determined and specific drawing and relaxation conditions are employed in the production steps of the layer.

The present invention is described in detail by way of illustrative Examples and Comparative Examples, to which the present invention is not limited.

The following determination and evaluation methods are used in the present invention.

(1) Ink absorption time

A 3 mm wide, 15 cm long lines are printed on a recording material with cyanogen or black ink by an ink jet printer (MJ-700V2C, manufactured by Seifo Epson Corporation). After printing, the lines are scrubbed with fingers and the time necessary for the lines to stand the scrubbing without blurring of the ink is measured. The amount of the ink is bout 0.4 $\mu l/cm^2$.

(2) Set-Off

In the same manner as in (1) above, a recording material is printed with cyanogen, Magenta, yellow or black ink. After printing, a paper (PPC paper TYPE6000, manufactured by RICOH) is placed on top thereof. When the ink does not transfer, the printed matter is evaluated as ○, and when the ink transfers, as X.

(3) Retention of ink concentration after water immersion

A recording material is printed with cyanogen, Magenta, yellow or black ink using the printer used in (1) over the area of 5×5 $cm^2$. The printed surface is immersed in flowing water for 3 minutes. The reflective concentration of each color before and after immersion in flowing water is measured by a Macbeth concentration meter (TR-927), and calculated by the following equation:

Retention of ink concentration after water immersion (%)=(concentration after immersion/concentration before immersion)×100

(4) Surface gloss

A reflectance of the recording material at an incident light angle of 60° and a reflected light angle of 60° is measured using VGS-1001DP manufacture by Nippon Denshoku Kogyo.

(5) Light permeability

According to JIS-K6714, the light permeability of the recording material is measured using a Poyic integral spherical H.T.R. meter (manufactured by Nippon Seimitsu Kogaku). The smaller this value is, the higher the opacity is.

(6) Apparent specific gravity

A substrate film is precisely cut out in 5.00 cm×5.00 cm square. The thickness is measured at 50 points to obtain an average thickness (t $\mu$m); and the film is weighed to 0.1 mg and expressed as W g. The apparent specific gravity is calculated from the following equation.

$$\text{Apparent specific gravity}=x\times 10^4/(5\times 5\times t)$$

(7) Surface coating ratio of fluorine atom by ESCA

Using ESCA (850) manufactured by Shimazu Corporation and Mg-Ka rays (1254 eV) as a light source at an output of 9 kV×30 mA, the peak area of the ink receiving layer due to fluorine, carbon, oxygen, nitrogen or hydrogen is determined. The obtained value is multiplied with a coefficient obtained from detection sensitivity of each element and converted to the atomic number, based on which the ratio is calculated. The ratio indicates the degree of localization of the fluorine compound used as a surfactant, on the surface of the ink receiving layer.

(8) Surface roughness

According to JIS-B0601-1982, the surface roughness of the ink receiving layer and the easy slip layer is determined by measuring the center line average thickness with a Surfcon 300A type surface roughness meter (manufactured by Tokyo Seimitsu) at probe diameter 2 $\mu$m, probe pressure 30 mg, determination pressure 30 mg and cut-off 0.8 mg.

(9) Thermal shrinkage

A strip (10 mm wide, 250 mm long) is taken from the recording material and marked at 200 mm intervals. The strip is fixed under a constant tension of 5 g, and the distance A between the marks is measured. The distance B after placing the strip in an oven at 150° C. for 30 minutes without tension is measured and the thermal shrinkage is calculated from the following equation:

$$\text{Thermal shrinkage (\%)}=[(A-B)/A]\times 100$$

(10) Wrinkles caused by printing

The recording material (A4 size) is printed by an ink jet printer (MJ-700V2C, manufactured by Seiko Epson Corporation). Occurrence of wrinkles is expressed by X, and absence thereof as ○.

(11) Travel performance

Using the printer of (1), the travel performance of the recording material is evaluated. When the material is carried in a constant manner without duplication of the printed letters or missing letters, it is expressed by ○, and otherwise as X.

(12) Inplane birefringence

The substrate film is cut out in 10.00 cm×10.00 cm, and weighed (W g). The substantial thickness (T cm) which is irrelevant to the void content is calculated from the following equation using the density ρ (g/cm$^3$) obtained when the film does not have voids.

$$T=W/(\rho\times 100)$$

Then, using a molecular orientation meter MOA-2001A manufactured by Kanzaki Paper MFG Co., Ltd. and the thickness T obtained above, the refractive indices in the microwave region along lengthwise principal axis and transverse principal axis are determined. According to the following equation, the inplane birefringence is calculated.

Inplane birefringence=refractive index along lengthwise principal axis−refractive index along transverse principal axis

(13) Water resistance

After measuring the retention of ink concentration after water immersion, the printed surface is transferred with OHP, and when the color is confirmed, it is expressed by ○, and otherwise as X.

EXAMPLE 1

A coating solution for forming an ink receiving layer was prepared by mixing polyvinyl alcohol (9.2 wt %, cationic, CM-318, manufactured by KURARAY CO., LTD.), water soluble melamine resin (0.6 wt %, SUMIMAL, manufactured by Sumitomo Chemical Industries, Ltd.), surfactant (0.2 wt %, perfluoro compound, Fluorad FC-430, manufactured by Sumitomo 3M) and water (90 wt %), relative to the coating solution. A polyester resin (0.2 g/m$^2$, VIRON MD-16, manufactured by Toyo Boseki Kabushiki Kaisha) was previously applied to a substrate film (125 $\mu$m, Crisper® G2312, manufactured by Toyo Boseki Kabushiki Kaisha) on the surface having higher gloss to form an intermediate layer. On the intermediate layer was applied the above-mentioned coating solution for an ink receiving layer, so that the applied amount after drying became 18 g/m$^2$, and the layer was dried at 120° C. for one minute and at 150° C. for 3 minutes to give a recording material. The ink absorption time, set-off, retention of ink concentration after water immersion and surface gloss of this material were evaluated, the results of which are summarized in Table 1.

Comparative Example 1

In the same manner as in Example 1 except that, in forming an ink receiving layer, the drying temperature was set to 120° C. for 4 minutes, a recording material was obtained.

EXAMPLE 2

In the same manner as in Example 1 except that a coating solution for forming an ink receiving layer was prepared by mixing polyvinyl alcohol (9.0 wt %, GH-20, manufactured by The Nippon Synthetic Chemical Industry Co., Ltd.), water soluble melamine resin (0.7 wt %, SUMIMAL, manufactured by Sumitomo Chemical Industries, Ltd.), cationic compound (0.1 wt %, polymer of dimethyldiallyl ammonium chloride, Kayafix UR, manufactured by NIPPON KAYAKU CO., LTD.), surfactant (0.2 wt %, perfluoroalkylethylene oxide adduct, Megafac F-142D, manufactured by DAINIPPON INK AND CHEMICALS, INC.) and water (89 wt %), a recording material was obtained.

EXAMPLE 3

In the same manner as in Example 2 except that the surfactant used for the ink receiving layer was silicon type (Paintad PT-32, manufactured by Dow Coning, Asia), a recording material was obtained.

The recording materials obtained in Examples 1 to 3 and Comparative Example 1, and exclusive gloss film (Comparative Example 2), manufactured by Seriko Epson Corporation were evaluated, the results of which are summarized in Table 1.

TABLE 1

| | Ink drying time (sec) cyanogen | Ink drying time (sec) black | Set-off | Retention of ink concentration after immersion (%) C | M | Y | B | Gloss (%) | Fluorine atom surface coating ratio (%) | Light permeability (%) | Apparent specific gravity |
|---|---|---|---|---|---|---|---|---|---|---|---|
| Ex.1 | 3 | 3 | ○ | 90 | 90 | 90 | 90 | 94 | 20 | 9 | 1.10 |
| Com. Ex. 1 | 3 | 3 | ○ | 10 | 10 | 5 | 10 | 93 | 22 | 9 | 1.10 |
| Ex. 2 | 3 | 3 | ○ | 90 | 90 | 90 | 85 | 91 | 25 | 9 | 1.10 |
| Com. Ex. 2 | 2 | 3 | ○ | 90 | 90 | 90 | 90 | 50 | 0 | 8 | 1.45 |
| Ex. 3 | 3 | 3 | ○ | 90 | 90 | 90 | 90 | 91 | 0 | 9 | 1.10 |

The recording materials of Examples 1 and 3 showed superior ink absorption time, superior retention of ink concentration after water immersion and high surface gloss and was free of set-off. The printed matter printed by the ink jet printer (MJ-700V2C, manufactured by Seifo Espon Corporation) had high gloss, high quality and high grade and was superior in appearance like silver salt photographs.

In contrast, the recording material of Comparative Example 1 showed low retention of ink concentration after water immersion, and the recording material of Comparative Example 2 showed poor surface gloss and was insufficient in grade.

EXAMPLE 4

A starting material mixture of polyethylene terephthalate resin (83 wt %) having an intrinsic viscosity of 0.62, polystyrene for general use (13 wt %, T575-57U, manufactured by Mitsui Toatsu Chemicals, Inc.) and anatase-type titanium dioxide (4 wt %, TA-300, manufactured by Fuji Titan Corp.) was fed into an extruder and melt-extruded at 290° C., which was followed by casting on static adhesion to a cooling roll at 30° C., whereby an undrawn film having a thickness of about 950 $\mu$m was obtained.

Then, this film was preheated on a roll heated to 70° C. heated with an infrared heater, drawn 3.7 times in the lengthwise direction between rolls having different speeds. The temperature of high speed roll (drawing roll) was 70° C.

Immediately after drawing, the film was subjected to relaxation by 14% between rolls without cooling to make the lengthwise draw ratio after relaxation 3.2.

The film after relaxation was led to a tenter, preheated at 140° C. for 8 seconds and crosswisely drawn 3.6 times at said temperature. The film was then heated at 220° C. for 5 seconds, crosswisely re-drawn by 8% at said temperature, and heated at said temperature for 5 seconds.

In this way, a 100 $\mu$m-thick polyester film having fine voids was obtained.

As an intermediate layer, a mixture of polyvinyl alcohol resin (ca. 2 wt %, GH-20, manufactured by the Nippon Synthetic Chemical Industry Co., Ltd.) and polyurethane resin (ca. 2 wt %, ELASTRON H-3, manufactured by Daiichi Kogyo Seiyaku) having isocyanate group and a mixed solution of water and isopropyl alcohol (7/3, weight ratio) was applied to one surface of the above-mentioned polyester film with a wire bar #5. After coating, the film was dried at 80° C. for 2 minutes and at 170° C. for 30 seconds.

An easy slip layer of a mixture of copolymerized polyester resin (2 wt %, VYRON MD-16, manufacture by Toyo Boseki Kabushiki Kaisha), polyurethane resin (2 wt %, ELASTRON H-3, manufactured by Daiichi Kogyo Seiyaku) having isocyanate group, cationic acrylic resin (1 wt %, Adeka Katioace PD-50, manufactured by ASAHI DENKA KOGYO K.K.) as an antistatic agent and organic particles (1 wt %, Epostar MS, average particle size 1.5 $\mu$m, manufactured by NIPPON SHOKUBAI CO., LTD.) and a mixed solution of water and isopropyl alcohol (7/3, weight ratio) was applied to the other surface of the film with a wire bar #5. Then, the film was dried at 80° C. for 2 minutes and at 170° C. for 30 seconds.

On the intermediate layer was applied a mixture of polyvinyl alcohol (9.2 wt %, CM-318, manufactured by KURARAY CO., LTD.), melamine resin (0.6 wt %, SUMITEX M-3, manufactured by Sumitomo Chemical Industries, Ltd.), surfactant (0.2 wt %, Fluorad FC-430, manufactured by Sumitomo 3M) and water (90 wt %), and the layer was dried at 120° C. for one minute and at 150° C. for 3 minutes to give an ink jet recording material. The coated amount was 18 g/m$^2$ after drying. The film printed by an ink jet printer (MJ-700V2C, manufactured by Seifo Epson Corporation) had superior appearance like silver salt photographs. The fluorine atom surface coating ratio of the in receiving layer was 20%.

Comparative Example 3

In the same manner as in Example 4 except that, in forming an ink receiving layer, the drying temperature was set to 120° C. for 4 minutes, an ink jet recording material was obtained.

EXAMPLE 5

In the same manner as in Example 4 except that polyvinyl alcohol resin (9.1 wt %, GH-20, manufactured by The Nippon Synthetic Chemical Industry Co., Ltd.), melamine resin (0.6 wt %, SUMITEX M-3, manufactured by Sumitomo Chemical Industries, Ltd.), cationic compound (0.1 wt %, Kayafix UR, manufactured by NIPPON KAYAKU CO., LTD), surfactant (0.2 wt %, Kayafix UR, manufactured by NIPPON KAYAKU CO., LTD.), surfactant (0.2 wt %, Megafac F-142D, manufactured by DAINIPPON INK AND CHEMICALS, INC.) and water (90 wt %) were mixed and coated, an ink jet recording material was obtained.

EXAMPLE 6

In the same manner as in Example 4 except that, in forming a polyester film having fine voids, the lengthwise draw ratio was set to 3.2 and no lengthwise relaxation was done, an ink jet recording material was obtained.

EXAMPLE 7

In the same manner as in Example 4 except that an easy slip layer was not formed, an ink jet recording material was obtained.

The ink jet recording materials obtained in Examples 4 to 7 and Comparative Example 3, and the above-mentioned film of Comparative Example 2 were evaluated, the results of which are summarized in Table 2.

TABLE 2

| | Ink drying time (sec) | | | Retention of ink concentration after immersion (%) | | | | | | Surface roughness ($\mu$m) | | | Themal shrinkage (%) | | | | |
|---|---|---|---|---|---|---|---|---|---|---|---|---|---|---|---|---|---|
| | cyanogen | black | Set-off | C | M | Y | B | Gloss (%) | Light permeability (%) | ink receiving layer | easy slip layer | Apparent specific gravity | length | width | Inplane birefringence | Wrinkle | Travel performance |
| Ex. 4 | 3 | 3 | ○ | 90 | 90 | 90 | 90 | 94 | 8 | 0.02 | 0.35 | 1.08 | 1.5 | 0.4 | ○ | ○ | ○ |
| Com. Ex. 3 | 3 | 3 | ○ | 10 | 10 | 5 | 10 | 93 | 8 | 0.02 | 0.35 | 1.08 | 1.5 | 0.4 | ○ | ○ | ○ |
| Ex. 5 | 3 | 3 | ○ | 90 | 90 | 90 | 85 | 91 | 8 | 0.03 | 0.35 | 1.09 | 1.6 | 0.6 | ○ | ○ | ○ |

TABLE 2-continued

| | Ink drying time (sec) | | | Retention of ink concentration after immersion (%) | | | | | | Surface roughness (μm) | | | Themal shrinkage (%) | | | | |
|---|---|---|---|---|---|---|---|---|---|---|---|---|---|---|---|---|---|
| | cyanogen | black | Set-off | C | M | Y | B | Gloss (%) | Light permeability (%) | ink receiving layer | easy slip layer | Apparent specific gravity | length | width | Inplane birefringence | Wrinkle | Travel performance |
| Ex. 6 | 3 | 3 | ○ | 90 | 90 | 90 | 90 | 94 | 8 | 0.02 | 0.35 | 1.09 | 1.5 | 0.4 | −0.03 | X | ○ |
| Ex. 7 | 3 | 3 | ○ | 90 | 90 | 90 | 90 | 94 | 9 | 0.02 | 0.02 | 1.11 | 1.5 | 0.4 | ○ | ○ | X |
| Com. Ex. 2 | 2 | 3 | ○ | 90 | 90 | 90 | 90 | 50 | — | — | — | — | — | — | — | — | — |

EXAMPLE 8

A polyester film (E5101, manufacture by Toyo Boseki Kabushiki Kaisha, 100 μm) was used as a substrate film and a mixture of polyurethane resin (2 wt %, ELASTRON H-3, manufactured by Daiichi Kogyo Seiyaku) having isocyanate group and a mixed solution of water and isopropyl alcohol (7/3, weight ratio) was applied to one surface of the film with a wire bar #5 as an intermediate layer. Then, the layer was dried at 80° C. for 2 minutes and at 170° C. for 30 seconds.

A mixture of copolymerized polyester resin (2 wt %, VYRON MD-16, manufacture by Toyo Boseki Kabushiki Kaisha), polyurethane resin (2 wt %, ELASTRON H-3, manufactured by Daiichi Kogyo Seiyaku) having isocyanate group and acrylic resin (1 wt %, Adeka Katioace PD-50, manufactured by ASAHI DENKA KOGYO K.K.) as an antistatic agent, and a mixed solution of water and isopropyl alcohol (7/3, weight ratio) was applied to the other surface of the film with a wire bar #5 to form an easy slip layer. Then, the film was dried at 80° C. for 2 minutes and at 170° C. for 30 seconds.

On the intermediate layer was applied a mixture of cationic polyvinyl alcohol (9.2 wt %, CM-318, manufactured by KURARAY), melamine resin (0.6 wt %, SUMITEX M-3, manufactured by Sumitomo Chemical Industries, Ltd.), surfactant (0.2 wt %, Fluorad FC-430, manufactured by Sumitomo 3M) and water (90 wt %), and the layer was dried at 120° C. for one minute and at 150° C. for 3 minutes to give an ink jet recording material. The coated amount was 18 $g/m^2$ after drying. The film printed with an ink jet printer (MJ-700V2C, manufactured by Seiko Epson Corporation) had superior appearance. The fluorine atom surface coating ratio of the ink receiving layer was 20%, and the apparent specific gravity of the recorded material was 1.40.

Comparative Example 4

In the same manner as in Example 8 except that, in forming an ink receiving layer, the drying temperature was set to 120° C. for 4 minutes, an ink jet recording material was obtained.

EXAMPLE 9

In the same manner as in Example 8 except that polyvinyl alcohol resin (9.0 wt %, GH-20, manufactured by The Nippon Synthetic Chemical Industry Co., Ltd.), melamine resin (0.7 wt %, SUMITEX M-3, manufactured by Sumitomo Chemical Industries, Ltd.), cationic compound (0.1 wt %, Kayafix UR, manufactured by NIPPON KAYAKU CO., LTD.), surfactant (0.2 wt %, Megafac F-142D, manufactured by DAINIPPON INK AND CHEMICALS, INC.) and water (90 wt %) were mixed and coated, an ink jet recording material was obtained.

The properties of the films obtained in Examples 8 and 9, and Comparative Example 4 are shown in Table 3.

TABLE 3

| | Ink drying time (sec) | | | Retention of ink concentration after immersion (%) | | | | | | | |
|---|---|---|---|---|---|---|---|---|---|---|---|
| | cyanogen | black | Set-off | C | M | Y | B | Gloss (%) | Light permeability (%) | Travel performance | Water resistance |
| Ex. 8 | 3 | 3 | ○ | 90 | 90 | 90 | 90 | 92 | 88 | ○ | ○ |
| Com. Ex. 4 | 3 | 3 | ○ | 10 | 10 | 5 | 10 | 92 | 88 | ○ | X |
| Ex. 9 | 3 | 3 | ○ | 90 | 90 | 90 | 85 | 93 | 88 | ○ | ○ |

As has been fully described, a recording material which is capable of absorbing ink quickly, which ink being hard to be removed even after pouring water thereon, and of color ink jet printing with high surface gloss can be provided by the present invention. The recording material of the present invention permits provision of printed matters having high gloss, high quality and high grade, like silver salt photographs.

What is claimed is:

1. A recording material comprising a substrate layer and an ink receiving layer formed on said substrate layer, wherein the ink receiving layer is a single layer having a retention of ink concentration after water immersion of not less than 30% and a surface gloss of not less than 55%, and comprises 50–99% by weight of an ink absorptive resin, a curing agent and at least one member selected from the group consisting of a silicon surfactant and a flourine surfactant.

2. The recording material of claim 1, having a light permeability exceeding 60%.

3. The recording material of claim 1, having a light permeability of not more than 60%.

4. The recording material of claim 1, wherein the time necessary for the ink receiving layer to absorb 0.1–1.0 $\mu l/cm^2$ of an ink is not longer than 50 seconds.

5. The recording material of claim 1, wherein the ink receiving layer further comprises a compound having a cation group.

6. The recording material of claim 1, wherein the curing agent is a water soluble melamine resin.

7. The recording material of claim 1, wherein the content of the curing agent is 0.1–20% by weight relative to the amount of the ink absorptive resin.

8. The recording material of claim 1, wherein the surfactant content of the ink receiving layer is 0.5–20% by weight.

9. The recording material of claim 1, wherein the substrate layer is a polyester film.

10. The recording material of claim 3, wherein the substrate layer is a film having a number of fine voids and an apparent specific gravity of not less than 0.7 and less than 1.32.

11. The recording material of claim 3, wherein the substrate layer has an inplane birefringence of from −0.02 to +0.04.

12. The recording material of claim 1, further comprising an intermediate layer between the substrate layer and the ink receiving layer.

13. The recording material of claim 12, wherein the intermediate layer comprises at least one member selected from the group consisting of polyester resin, polyurethane resin and polyacrylic resin.

14. The recording material of claim 1, further comprising an easy slip layer formed on the substrate layer on the opposite surface from the ink receiving layer.

15. The recording material of claim 14, wherein the easy slip layer comprises at least one member selected from the group consisting of polyester resin, polyurethane resin and polyacrylic resin, inorganic particles and/or organic particles, and an antistatic agent.

16. A method for producing the recording mater of claim 1, which comprises applying a composition comprising 50–99% by weight of an ink absorptive resin, a curing agent, at least one member selected from the group consisting of a silicon surfactant and a flourine surfactant, and a solvent as a coated layer on a substrate layer for the recording material, heating the coated layer at a first temperature not less than the boiling point of the solvent and not more than the boiling point plus 30° C., and further heating the layer at a second temperature higher than said first temperature to form an ink receiving layer on said substrate layer.

17. The method of claim 16, which comprises applying a composition comprising 50–99% by weight of an ink absorptive resin, a curing agent, at least one member selected from the group consisting of a silicon surfactant and a flourine surfactant and water on a substrate layer, heating the coated layer at 100–130° C. and further heating the layer at 130–180° C. to form an ink receiving layer.

* * * * *